United States Patent [19]

Taylor

[11] 3,986,267

[45] Oct. 19, 1976

[54] TIRE MEASUREMENT

[76] Inventor: Ivan Taylor, Hickory St., Schuylkill Haven, Pa. 17972

[22] Filed: June 26, 1975

[21] Appl. No.: 590,840

[52] U.S. Cl. ............................ 33/143 D; 33/147 H; 33/203.19; 33/203.16; 33/176
[51] Int. Cl.² ............................................ G01B 5/20
[58] Field of Search .......... 33/143 D, 143 R, 147 H, 33/137 L, 169 R, 203.19, 203.16, 179, 176; 156/13

[56] References Cited
UNITED STATES PATENTS

| | | | |
|---|---|---|---|
| 2,650,437 | 9/1953 | Glynn | 33/143 D |
| 3,633,279 | 1/1972 | Frazier | 33/143 D |

*Primary Examiner*—Richard E. Aegerter
*Assistant Examiner*—Willis Little
*Attorney, Agent, or Firm*—Burns, Doane, Swecker & Mathis

[57] ABSTRACT

A tire measuring instrument is disclosed for measuring the diameter and bead-to-bead dimension of a tire casing and correlating such measurement to a particular retreading matrix. A frame carries a plurality of rotatable cylinders, the periphery of each cylinder containing designations of selected retreading matrices. A carriage is mounted on the frame for translational movement relative to the cylinders. The carriage carries a plurality of indicators, each indicator being associated with a particular nominal tire size. A pair of legs are pivotally mounted on the frame and include pulley-carrying outer foot portions extending into a tire measuring zone. A plunger is attached to the carriage and is mounted for translational movement. The lower end of the plunger extends between the legs and into the tire measuring zone for engaging the crown of a tire being measured. A measuring cable is anchored to the plunger and extends across the tire measuring zone and around the leg-mounted pulleys for engaging both side walls of a tire being measured. A driving wheel is mounted on each cylinder axle. An indexing cable is mounted on the frame for resilient displacement and is wrapped around the driving wheels. The indexing cable is operably coupled to the measuring cable so as to be displaced in response to shifting movement of the plunger and deflection of the measuring cable during tire measurement. In this fashion, the cylinders are rotated by an amount related to the bead-to-bead dimension of the tire. The carriage is translatable in response to shifting of the plunger by an amount related to the diameter of the tire. As a result of the combined translation of the indicator and rotation of the cylinders the indicator pertaining to the tire being measured provides an immediate and direct read-out of a proper retreading matrix.

12 Claims, 11 Drawing Figures

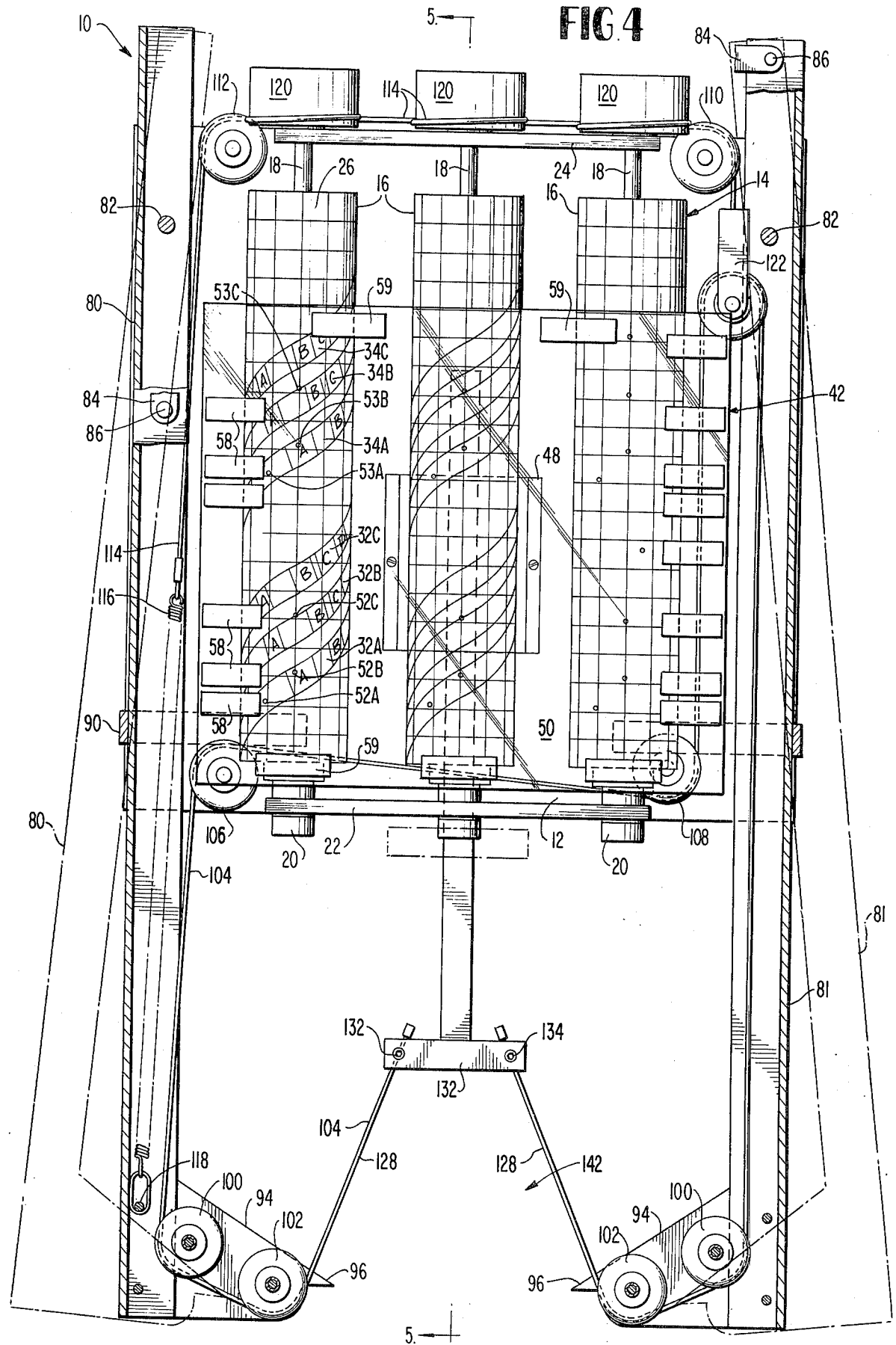

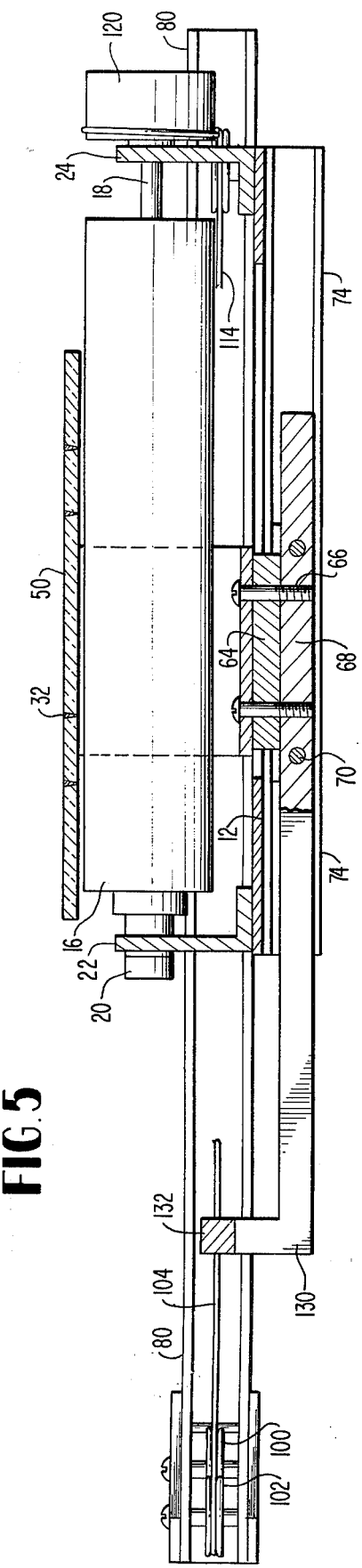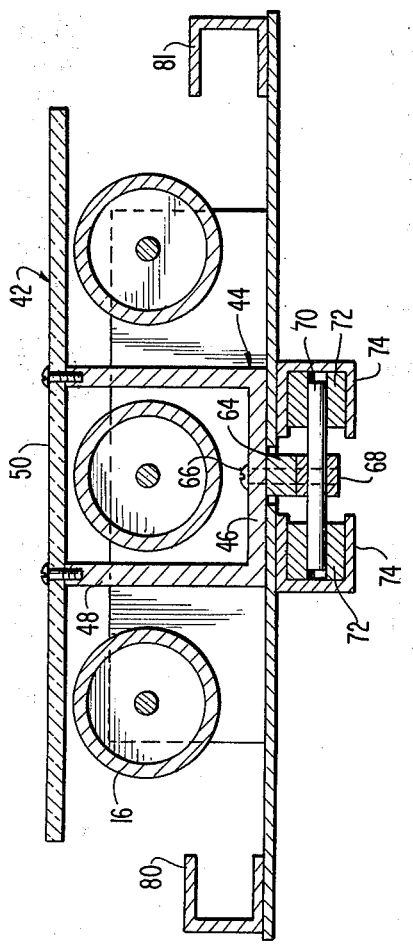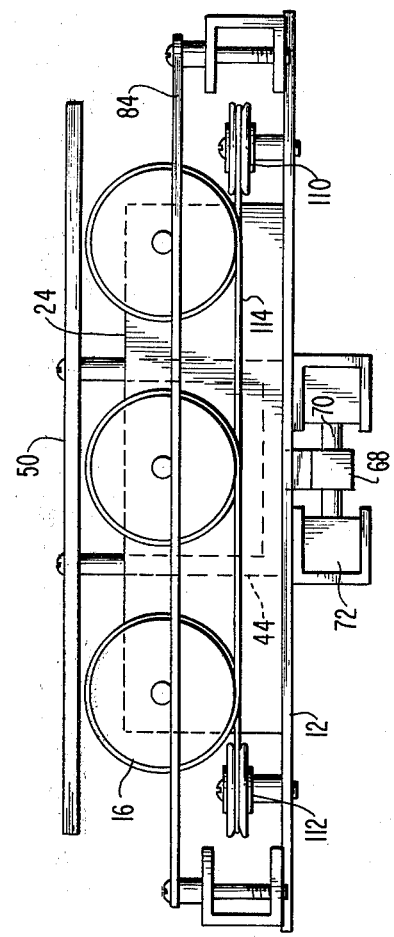

GREEN — RED — BLUE

TIRE MEASUREMENT

BACKGROUND AND OBJECTS OF THE INVENTION

This invention relates to tire measurement, and more particularly to the measurement of the diameter and bead-to-bead dimension of a tire casing in conjunction with a tire retreading operation.

In tire recapping or retreading operations, it is common to mount the tire upon a buffing machine which removes the remainder of the worn tread from the tire casing. Subsequently, new tread, or camelback, is affixed to the tire casing through the use of procedures and equipment that are well known in the art. For example, a molding process can be utilized in which the tire casing and camelback are inserted into a mold and are bonded together by vulcanization. Also employed are tread-applying machines wherein the camelback is joined to the tire casing as the casing is being power rotated.

In conjunction with such operations it is necessary to employ a matrix which carries appropriate tread configurations. The matrix is selected in accordance with the diameter and bead-to-bead dimension of the casing. An important factor in determining the quality of the finished product is the degree to which the matrix conforms to the configuration of the tire casing so as to optimize the vulcanizing pressure fit. Tires tend to vary significantly in size and shape and are subject to varying degrees of distortion from use, depending upon the manufacturer, style, model, etc. of the tire. This requires that the diameter and bead-to-bead dimension of each casing be accurately measured prior to being recapped so that the proper matrix can be selected.

In furtherance of this end numerous tire measuring machines and techniques have been proposed, as evidenced by the disclosures of U.S. Pat. Nos. 1,797,389, 2,636,277, 2,650,437, 3,007,251, 3,633,279, and 3,690,010. Prior proposed tire measuring devices may be characterized by serious shortcomings, such as providing only rough estimates of true tire size, being subject to distorted readings due to the presence of protruding sidewalls or scuff-bars, and requiring time-consuming hand measurement, or other measurement that is subject to human error. Some devices are in the form of large, immobile machines to which the tire must be brought and mounted in a special time-consuming operation. In present day facilities, which may process hundreds of tires per day, it is important that the proper matrix be determined quickly as well as accurately.

It is therefore, an object of the present invention to overcome problems of this sort.

It is another object of the present invention to provide a light-weight, easily manipulatable tire measuring instrument which can be operated rapidly to produce highly accurate measurements that minimize the chances for error.

It is a further object of the invention to provide such an instrument which is portable and which can be adapted to various tire-mounting machines.

BRIEF DESCRIPTION OF A PREFERRED EMBODIMENT OF THE INVENTION

These objects are achieved by the present invention which involves methods and apparatus for measuring the diameter and bead-to-bead dimension of a tire casing and providing a direct read-out of a retreading matrix suited for use in retreading such tire casing. The measuring instrument comprises a frame and at least one rotary member mounted for rotation on the frame. The periphery of the rotary member contains designations of specific matrices determined as a function of diameter and bead-to-bead dimension of the tire casing. A carriage is mounted to the frame for translational movement relative to the rotary member. The carriage carries an indicator for selectively indicating matrix designations on the rotary member. A plunger is attached to the carriage and is translatable in response to being pressed against the crown of a tire casing during measurement thereof to translate the carriage and indicator relative to the rotary member. A pair of legs are movably mounted on the frame such that outer foot portions of the legs can be inserted around a tire casing. Flexible measuring cable is supported by the plunger and the legs. This cable includes measuring segments which extend between the outer ends of the legs and to the plunger so that engagement between the measuring segments and both side walls of the tire casing deflects the segments. The measuring cable is drivingly coupled to the rotary member to rotate the rotary member in response to deflection of the measuring segments. Translation of the indicator and rotation of the rotary members is such that the indicator means directly indicates a retreading matrix suited to the tire casing being measured.

THE DRAWINGS

The objects and advantages of the present invention will become apparent from the subsequent detailed description thereof in connection with the accompanying drawings in which like numerals designate like elements, and in which:

FIG. 4 is a front elevatonal view of the tire measuring instrument in accordance with the present invention;

FIG. 5 is a cross-sectional view taken along line 5—5 of FIG. 4;

FIG. 6 is a cross-sectional view taken along line 6—6 of FIG. 1;

FIG. 7 is a top view of the measuring instrument;

DETAILED DESCRIPTION OF THE PREFERRED EMBODIMENT

Figure 1:
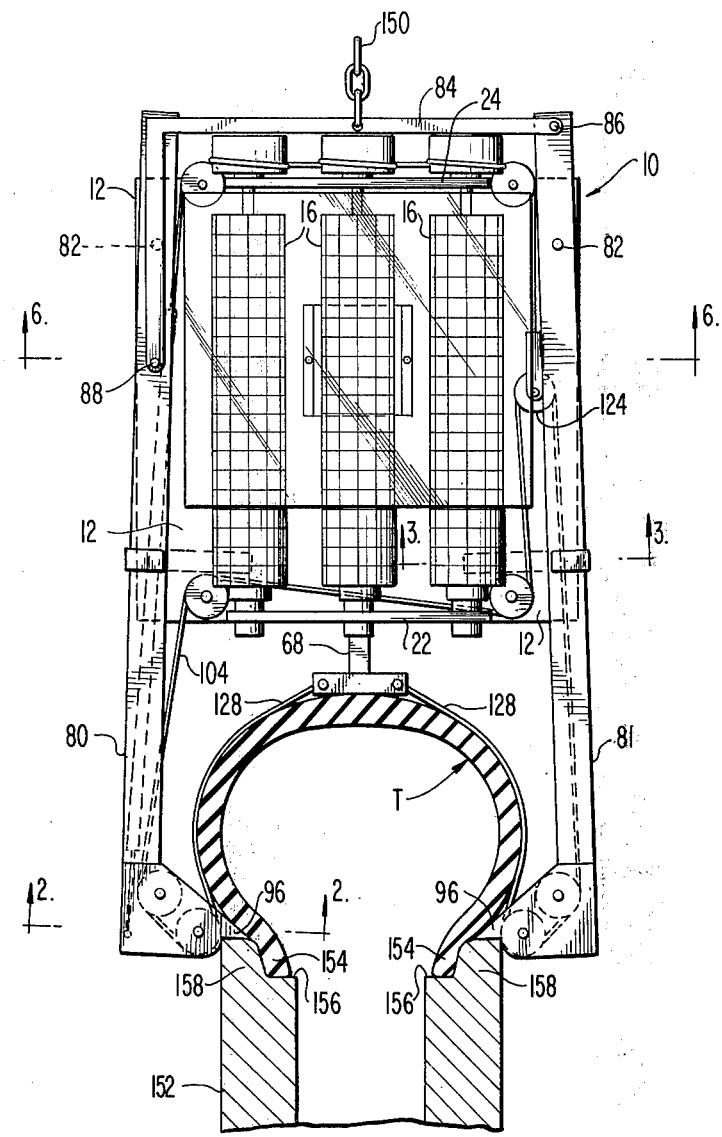
FIG. 1 is a front elevational view of a tire measuring instrument according to the present invention during a tire measurement operation.

The preferred tire measuring instrument 10 of the present invention includes a steel base frame 12 (FIG. 4). The frame 12 carries a matrix referencing assembly 14 which includes a plurality of rollers in the form of cylinders 16. These cylinders 16 each have axles 18, 20 that are rotatably mounted in bearing plates 22, 24 secured respectively at bottom and top ends of the frame 12. The cylinders 16 are arranged such that their axes of rotation are parallel.

The outer circumferential periphery of each cylinder carries a readout chart 26 which contains indicia references or designations of particular matrix sizes, determined as a function of the outer diameter and bead-to-bead dimensions of the tire.

Figure 11:
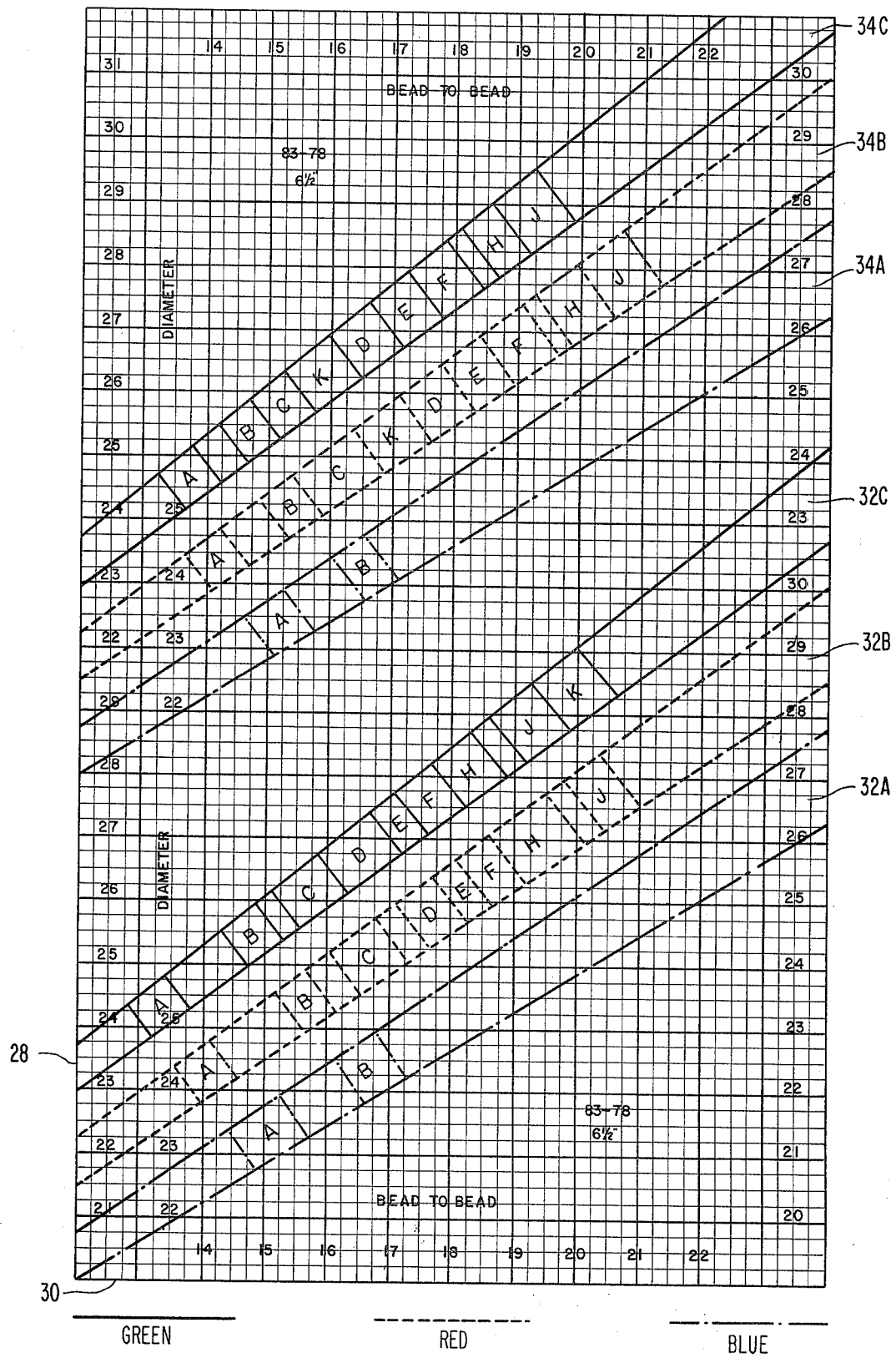
FIG. 11 is a front view of a read-out in a flattened condition in accordance with the present invention.

The chart 26 is of the type which includes an axial coordinate 28 pertaining to the outer diameter of the tire, and a circumferential coordinate 30 pertaining to the bead-to-bead dimesnion of the tire. This can be viewed in FIGS. 4 and 11, the latter depicting the chart in a flattened condition. Two sets of parallelograms 32 A, B, C, and 34 A, B, C extend spirally around the cylinder periphery and contain matrix designations A, B, C, D, etc. corresponding to particular matrix sizes. Each matrix designation is disposed in a region of the parallelogram whose diameter and bead-to-bead values correspond to the configuration of that matrix. Each parallelogram 32 A, B, C, 34 A, B, C relates to a particular nominal diameter of a tire casing. For example, the parallelograms 32A, 34A are calibrated to a 13 inch tire, parallelograms 32B, 34B to a 14 inch tire, and parallelograms 32C, 34C to a 15 inch tire. Each cylinder carries a different chart pertaining to different tires. Each chart can include as many parallelograms as needed to reference a specific tire model.

Each set of parallelograms corresponds to a type of tire. In this connection, it has been found that tires of different manufacturers, or even different tire styles of the same manufacturer, can be of highly diverse size and shape, even though allegedly being of the same nominal diameter. Moreover, various tires exhibit different distortion characteristics during use. As a result, the sets of parallelograms have been geared to particular tire models. Moreover, the various parallelograms of each set correspond to the various nominal diameters of the particular tire model in question.

In the preferred embodiment disclosed herein, three cylinders 16 are provided, each carrying a chart 26 having two sets of two parallelograms. Thus, individual measurement is provided for a wide range of tires. As will be appreciated, more or fewer cylinders can be provided as needs dictate.

It should be understood that such charts are not new in principle and thus are not of independent patentable significance.

Figure 10:
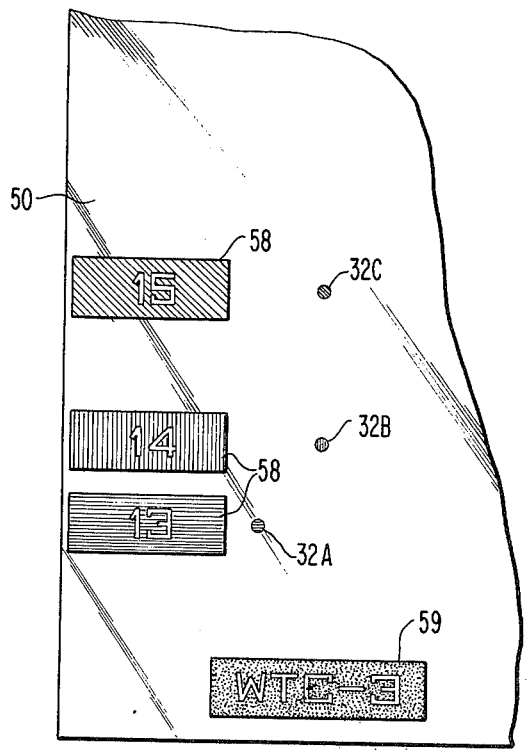
FIG. 10 is a fragmentary view of a portion of a transparent carriage plate in accordance with the present invention.

Slidably mounted on the frame 12 is a carriage 42 (FIGS. 4 and 6). The carriage 42 includes a base 44 having a lower plate 46 and side plates 48 extending therefrom. The side plates, at their outer ends, fixedly mount a cover plate 50 which overlies the cylinders. The cover plate is formed of transparent material so that the cylinder-mounted charts can be viewed therethrough. Mounted on the cover plate are a plurality of sets of indicator pins 52 A, B, C; 53 A, B, C. Each set of pins is associated with a particular model of tire, i.e., with a particular set of parallelograms. Furthermore, each pin A, B, C of a given set is associated with a particular nominal diameter of the associated tire model, i.e., with a particular parallelogram of that set. By employing a plurality of indicator pins for each set of parallelograms, rather than a single pin for each set, the parallelograms may be more closely positioned, thereby reducing the size of the cylinder. The indicator pins and parallelograms can be coded, e.g., by color coding for example. That is, a green pin would correspond to a green parallelogram, and so on, to facilitate reading of the chart. For the sake of convenience, various nominal tire diameters can be inscribed on the cover plate 50 in colored backgrounds which correspond to the color of the indicator pin and parallelogram associated with such diameter, as shown at 58 in FIGS. 4 and 10. An additional inscription 59 can be made to identify the specific tire model to which each particular set of parallelograms pertains.

Figure 8:
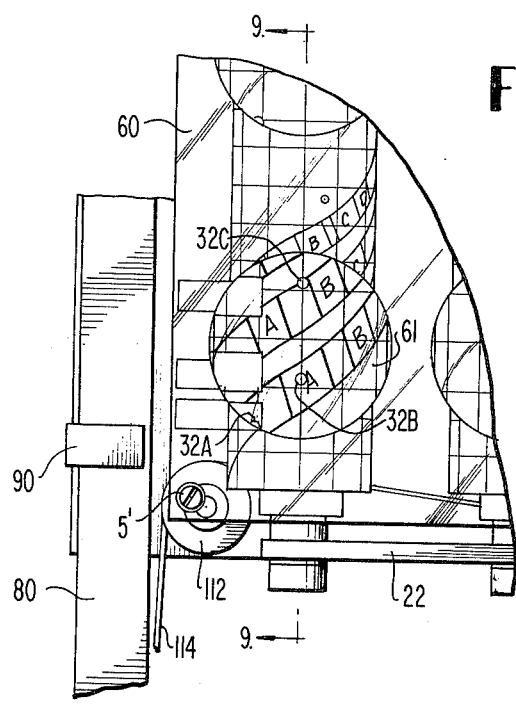
FIG. 8 is a fragmentary view of the measuring instrument depicting a magnifier attachment secured thereto.
Figure 9:
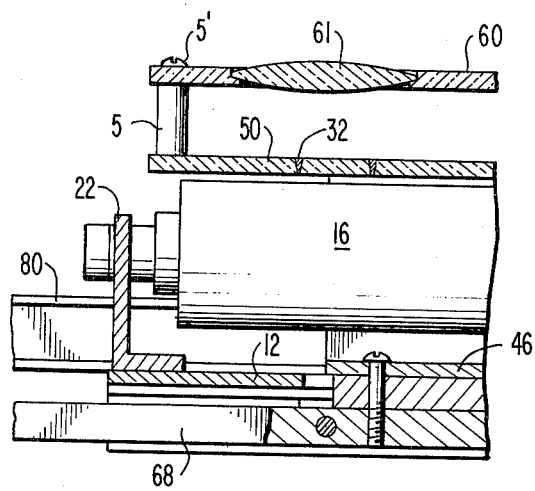
FIG. 9 is a longitudinal sectional view taken along line 9—9 of FIG. 8.

To facilitate reading of the charts a magnifier may be disposed over the cover plate 50 to magnify the chart indicia. This can be accomplished by mounting an auxiliary plate 60 onto the cover plate corners via suitable spacers and screws S, S' (FIGS. 8 and 9). Six magnifier glass elements 61 are embedded within the auxiliary plate in the regions of the particular parallelogram sets to be viewed on the three cylinders.

The carriage 42 is mounted for sliding translative movement relative to the frame 12 and cylinders 16 in a direction parallel to the cylinder axes of rotation. This is achieved by the provision of a guide bar 62 on the backside of the lower plate 46, and orienting the guide bar for sliding movement within a slot 64 in the frame 12 (FIG. 6). The slot 64 extends parallel to the cylinder axes to guide the carriage in a proper direction of movement.

Fixedly attached to the guide bar by means of screws 66 is a plunger 68 which, in a neutral position extends beyond the frame 12 (FIG. 4). Attached to the plunger and projecting outwardly therefrom are a plurality of mounting pins 70 which carry guide blocks 72 (FIG. 6). These guide blocks 72 are mounted for sliding movement in a pair of tracks 74 which are affixed to the backside of the frame 12 in straddling relation to the plunger 68.

The plunger is thus mounted for inward and outward sliding movement which can be limited by stop elements (not shown) positioned in the tracks. In this manner the plunger 68 is drivingly connected to the indicator pins such that inward and outward reciprocal movement of the plunger 68 translates the carriage 42, and the indicator pins 52 carried thereby, relative to the cylinders in directions parallel to the cylinder axes.

Pivotably mounted at the sides of the frame 12 are a pair of legs 80, 81. The legs 80 are mounted by pivot pins 82 so that the outer ends of the legs project outwardly beyond the frame end and are pivotable toward and away from each other. A right angle link 84 (FIG. 1) is pivotably mounted at 86 to the inner end of one of the legs 81, and is pivotably mounted at 88 to the other leg 80 at a position intermediate its pivot pin 82 and its outer end. This arrangement assures equal and symmetric pivotal movement of the legs 80, 81.

Figure 2:
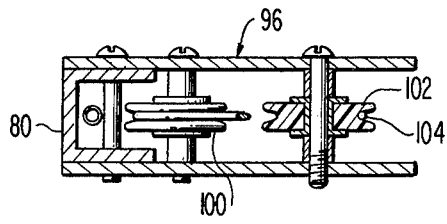
FIG. 2 is a cross-sectional view taken along line 2—2 of FIG. 1.

A bracket 90 is affixed to each leg 80, 81 (FIGS. 2 and 7) such that a portion 91 of each bracket 90 extends along the backside of the frame 12 to guide the legs for proper movement during pivotal action thereof.

Figure 3:
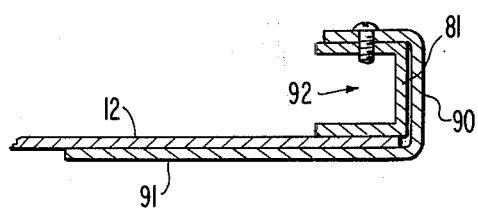
FIG. 3 is a cross-sectional view taken along line 3—3 of FIG. 1.

The legs 80, 81 are each formed by U-shaped bars which define channels 92 (FIG. 3) and which include mutually facing foot members 94. The foot members 94 terminate in pointed toe elements 96 which function in a manner to be later explained.

A coil tension spring (not shown) can be attached between the legs to bias the legs inwardly together toward a retracted posture (solid line position of FIG. 4) while allowing outward pivotal movement toward extended postures (broken line position of FIG. 4). At its outer end each leg carries a pair of freely rotatable pulleys 100, 102 (FIGS. 4 and 2) which are circumferentially grooved for the reception of a cable as will be more fully explained. Similar pulleys 106, 108, 110, 112 are mounted at four corners of the frame 12.

Extending around the pulleys 110, 112 that are disposed remotely from the rear end of the frame is a first indexing cable 114. While the cable can comprise wire, rope, etc., it preferably is fabricated of twisted steel strands and is preferably identical to the control cable utilized in aircraft. At one end the indexing cable is secured to the free end of a coil tension spring 116. The spring is disposed for flexure within the channel 92 of the leg 80 and includes another end secured at 118 to the outer end of the leg 80.

The indexing cable 114 is drivingly connected to the cylinders 16, preferably by being sequentially wrapped around drive wheels 120 that are affixed to the cylinder axles 18. Thus, by displacing the free end 120 of the indexing cable 114 the cylinders 16 are rotated. The cylinders are biased toward neutral positions (FIG. 4) through the bias exerted by the spring 116 on the indexing cable 114.

An end of the indexing cable 114 is connected to a U-bracket 122. Rotatably mounted to the U-bracket is a floating pulley 124. Extending around the floating pulley 124, the two frame-mounted pulleys 106, 108, and the leg-mounted pulleys 100,102 is a second, measuring cable 128. The ends of the measuring cable 128 are anchored to the outer end of the plunger 68. In this connection the plunger, at its outer end, has a T-shaped configuration, including a post 130, and a cross-bar 132. The ends of the measuring cable 128 are anchored at 134, 136 to the ends of the cross bar 132. The portions of the measuring cable 128 which extend from the toes 96 to the cross bar 132 constitute measuring segments 140 which are enlargeable by displacement of the plunger 68 or the legs 80, 81, or by deflection of the measuring cable 128, as will be discussed.

The plunger 68 and foot members 94 define a measuring zone 142 within which the measuring segments 140 of the measuring cable 128 extend. The measuring cable 128 is kept taut by the bias exerted by the spring 116.

It will be appreciated that the measuring cable 128 is drivingly connected to the matrix referencing assembly 14. That is, inward displacement of the plunger 68 from its outward or neutral position displaces the measuring cable 128, and thus the floating pulley 124 and the indexing cable 114, to rotate the cylinders 16. Additionally, outward extension of the legs 80, 81 likewise causes displacement of the measuring cable 128 to rotate the cylinders 16. Moreover, deflection of the measuring segments 140 of the measurinng cable 128 from their straight, taut posture between the toes 96 of the legs and the cross bar 132 causes the floating pulley 124 and the indexing cable 114 to be displaced in a cylinder-rotating manner.

In the retreading facility the measuring instrument 10 is preferably hung above a tire buffing machine or a tire retreading machine. To this end, a chain 150 can be connected to the angle bar 84 for connection to a suitable mechanism providing vertical movement of the instrument 10. Since the instrument is relatively small and light-weight, it is easily manipulatable by hand.

OPERATION

In practice, a tire T to be retreaded is mounted on a buffing machine 152 (FIG. 1) and is inflated. By known procedure, the old tread portion of the tire is removed. There then remains mounted on the buffing machine a tire casing having a particular outer diameter and a particular bead-to-bead dimension. These dimensions of the casing are of prime importance in determining which matrix is to be used for the retreading process.

Measurement of the buffed tire casing can be accomplished conveniently while still mounted on the buffing machine, thereby eliminating a separate tire mounting procedure. Alternatively, if a retreading machine is to be employed for the retreading operation, the tire can be mounted on this retreading machine and then measured.

At any rate, with the buffed tire being mounted on the buffing machine in an inflated condition, and with bead portions 154 of the casing being seated within channels 156 of the machine, measurement is made.

With the measuring instrument 10 suspended above the buffing machine 152, it is merely necessary to lower the instrument so that the tire casing is caused to enter the measuring zone 142. To facilitate this, the legs 80, 81 are pivoted outwardly to accommodate the width of the tire casing. The instrument is continued to be lowered until the pointed toes 96 of the legs 80, 81 rest atop flanges 158 of the machine. In this position the toes 96 engage the tire casing T at the upper end of the beads 154, and the measuring cable segments 128 have been flexed into conformity with the profiles of the casing side walls. During this step the post 130 and cross bar 132 of the plunger contact the crown of the tire casing, causing the plunger 68 to be displaced inwardly. As will be explained, this simple movement of the legs 80, 81 and plunger 68 and deflection of the measuring cable 128 produces an instant read-out of a proper matrix to be employed.

The indicator pins 52 A–C and 53 A–C and corresponding parallelograms are precalibrated in relation to the neutral position of plunger 68 and measuring cable 104 so that all increments of plunger and measuring cable displacement produce read-outs in accordance with the particular tire casing being measured. Assuming that the particular manufacturer and model of the tire casing T being measured corresponds to the code "WTC-3" pertaining to the set of parallelograms 32 illustrated in FIG. 10, by knowing the nominal diameter of the casing, i.e., 13, 14, or 15 inches, the proper one of indicator pins 52 A–C can be referred to. The color coding of the color blocks 58 and the coloring of the indicator pins and parallelograms aids in this determination. Assuming the diameter of the tire casing to be 13 inches, then the indicator pin 52A and its corresponding parallelogram 32A will be referenced.

When the instrument has been mounted upon the tire casing as shown in FIG. 1, the plunger 68 will have been depressed, the legs 80, 81 will have been extended outwardly, and the measuring segments 128 of the measuring cable 104 will have been flexed around the tire profile. Each of these movements serves to shift the indicator pin 52A and the associated parallelogram 32a relative to one another.

That is, upward or inward movement of the plunger 68 translates the indicator pin relative to the cylinders in accordance with the diameter of the tire casing. In addition, such upward movement of the plunger 68 shifts the free ends of the measuring cable 104 upwardly, thereby displacing the floating pulley 124 and the indexing cable 114 to rotate the cylinders 16.

In addition, the measuring segments 128 of the measuring cable have been flexed outwardly so as to conform to both side wall profiles of the tire casing. This flexing, along with the extension of the legs 80, 81 further displaces the floating pulley 124 and the indexing cable 114 and thus further rotates the cylinders.

The combined translational and rotational movements of the indicator pin 52A and parallelogram 32A shift the indicator pin to a position within the parallelogram and within or adjacent one of the matrix indicia designations to enable an operator to immediate "read-out" which matrix is proper.

The term "measurement" as used herein is thus intended to include the determination of suitable matrices from the charts, as well as the determination of the actual diameter and bead-to-bead dimension of the tire casing. In this latter connection, the axial ordinate 28 will provide the outer diameter of the tire casing, and the circumferential ordinate 30 will supply the bead-to-bead dimension.

Consequently, in a matter of a few seconds the plunger will have been displaced to slide the carriage and the indicator pins relative to the charts, and the measuring cable will have been shifted through a combination of plunger and leg displacement and measuring cable flexure to rotate the parallelograms relative to the indicator pins. By merely viewing the appropriate indicator pin and noting its position on the associated parallelogram, the proper matrix in indicated.

This is achieved in a minimal amount of time since there is no need to remount the tire casing on a separate machine. Measuring time and the possibility of error are reduced by the direct matrix read-out which renders it unecessary for an operator to to correlate measurements with a chart in a separate operation. Highly accurate results are assured since the bead-to-bead dimension is obtained through measurement of both side wall profiles. Equipment size and expense is reduced since the instrument is relatively compact and requires no special mounting structure for the tire casing. The instrument can be conveniently suspended above a buffing or retreading machine and is easily hand-manipulated by an operator.

In this connection, a full-scale working model of the invention has been constructed. The model has an overall height of about 23 inches, a width of about 12 inches, a depth of about five inches, and a weight of about 13 pounds. Measurements can be made by the instrument in approximtely three to four seconds.

Since the instrument is light and conveniently portable, it can be easily hand-carried to any part of the retreading facility for making rapid on-the-spot measurements to facilitate sorting of a batch of unbuffed tires.

The instrument is versatile in that the drive ratio between the drive wheels and their associated rollers can be varied to accommodate variations in bead-to-bead dimension, such as might be caused by curbguards or the like.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Apparatus for measuring the diameter and bead-to-bead dimensions of a tire, the apparatus comprising:
   frame means;
   a read-out cylinder mounted for displacement on said frame means;
      said read-out cylinder carrying designations of selected retreading matrices determined as a function of tire diameter and bead-to-bead dimension;
   an indicator mounted on said frame means for translation relative to said frame means and relative to said read-out cylinder;
   a shiftable measuring plunger mounted on said frame and translatable into engagement with the crown of the tire;
      said shiftable measuring plunger being drivingly connected to said read-out cylinder and said indicator to displace both said read-out cylinder and said indicator relative to one another in response to the shifting of said shiftable measuring plunger upon engagement of the crown of the tire during measurement of a tire; and
   a deflectable measuring cable mounted on said frame means and anchored to said plunger, said cable including segments that are flexibly engageable with both side walls of the tire;
   said deflectable measuring cable drivingly connected to said read-out cylinder to displace said read-out cylinder in response to the deflection of said deflectable segments upon engagement thereof with both side walls of the tire during tire measurement.

2. Apparatus for measuring the diameter and bead-to-bead dimensions of a tire casing and providing a direct read-out of retreading matrix suitable for use in retreading of the tire casing, the apparatus comprising:
   a frame;
   matrix referencing means mounted on said frame and including;
      a reference chart containing designations of specific retreading matrices determined as a function of diameter and bead-to-bead dimension of the tire casing, and
      indicator means for indicating matrix references on said chart;
         said indicator means and said chart each being mounted for displacement relative to one another; and
   measuring means mounted on said frame for measuring the diameter and bead-to-bead dimension of the tire casing, said measuring means including:
      shiftable arm means for engaging the crown of said tire casing, and
      a pair of flexible cable segments for flexibly engaging and conforming to both side walls of the tire casing, said cable segments being interconnected to each other such that flexure of both of said cable segments is combined;
   said shiftable arm means being drivingly connected to said indicator means, and said interconnected cable segments being drivingly connected to said reference chart, so as to produce relative displacement of said indicator means and said chart in accordance with the measured diameter and bead-to-bead dimension of the tire casing such that said indicator provides a direct reading on said chart of the proper matrix to be used.

3. Apparatus according to claim 2 further including a pair of legs movably attached to said frame, said legs including outer foot portions arranged to be inserted around the tire casing; said cable segments being anchored to said arm means and extending around cables carried by said foot portions.

4. An instrument for measuring the diameter and bead-to-bead dimension of a tire casing and providing a direct read-out of a retreading matrix suited for use in retreading such tire casing, the apparatus comprising:
frame means;
at least one rotary member mounted for rotation on said frame means;
the periphery of said rotary member containing designations of specific matrices determined as a function of diameter and bead-to-bead dimension of the tire casing;
a carriage mounted to said frame for translational movement relative to said rotary member, said carriage carrying indicator means for selectively indicating matrix designations on said rotary member;
a plunger attached to said carriage and being translatable in response to being pressed against the crown of a tire casing during measurement thereof to translate said carriage and said indicator means relative to said rotary member,
a pair of legs movably mounted on said frame such that outer foot portions of said legs may be inserted around a tire casing; and
flexible measuring cable means supported by said plunger and said legs;
said cable means including measuring segments extending between the outer ends of said legs and said plunger such that engagement between said measuring segments and both side walls of said tire casing during casing measurement deflects said segments;
said measuring cable means being drivingly coupled to said rotary member to rotate said rotary members in response to deflection of said measuring segments;
the translation of said indicator means and the rotation of said rotary member being such that said indicator means directly indicates a retreading matrix suited to the tire casing.

5. Apparatus according to claim 4 wherein said legs are pivotably mounted to said frame means so that said foot portions are movable toward and away from one another; said foot portions carrying pulley means around which said measuring cable means extends.

6. Apparatus according to claim 5 wherein said frame carries a plurality of pulleys; said measuring cable means comprising a steel cable having its ends anchored to said plunger and extending around said frame-mounted pulleys and said leg-mounted ppulleys; an indexing cable being spring mounted for yieldable displacement; said indexing cable being in driving connection with said rotary member; a floating pulley connected to said indexing cable; said measuring cable extending around said floating pulley such that said indexing cable is displaced in response to inward shifting of said plunger and deflection of said measuring cable segments to rotate said rotary members.

7. Apparatus according to claim 6 wherein said at least one rotary member comprises a plurality of rotary members, in the form of cylinders, rotatably mounted to said frame; each cylinder carrying a chart around its periphery; each cylinder chart including a plurality of matrix designations pertaining to a different tire size; and an indicator associated with the designations of each tire size; said indicators being carried by a transparent cover plate overlying said cylinders, said plate being connected to said plunger for translatable movement.

8. Apparatus according to claim 7 including drive wheels coupled to rotary axles of said cylinders; said drive cable being wrapped around said drive wheels such that displacement of said drive cable rotates all of said cylinders.

9. Apparatus according to claim 8 and further including a link pivotably interconnecting said legs to provide simultaneous and equal pivotal movement of said legs.

10. Apparatus according to claim 9 further including an additional transparent plate overlying said cover plate and carrying magnifier means for enlarging the view of said matrix designations.

11. Apparatus for measuring the diameter and bead-to-bead dimension of a tire casing and correlating such measurement to a particular retreading matrix, the apparatus comprising:
a frame;
a plurality of cylinders rotatably mounted on said frame;
the periphery of each cylinder containing designations of selected retreading matrices;
a carriage carrying a plurality of indicators, each indicator being associated with a particular nominal tire size;
said carriage being mounted on said frame for translational movement relative to said cylinders in directions parallel to the cylinder axes;
a pair of legs pivotably mounted to said frame and including lower foot portions extending from said frame into a tire measuring zone;
each leg carrying pulley means;
a plunger attached to said carriage and being mounted for translational movement relative to said frame;
the lower end of said plunger extending between said legs and into said tire measuring zone for engaging the crown of a tire being measured;
a measuring cable anchored to said plunger and extending across said tire measuring zone and around said pulleys in said legs for engaging both side walls of a tire being measured;
a driving wheel mounted on each cylinder axle;
an indexing cable mounted on side frame for resilient displacment and being wrapped around said driving wheels;
said indexing cable being operably coupled to said measuring cable so as to be displaced in response to displacement of said measuring cable to rotate said cylinders by an amount related to the bead-to-bead dimension of the tire, and said carriage being translatable in response to shifting of said plunger by an amount related to the diameter of the tire, such that the indicator pertaining to the tire being measured provides an immediate and direct read-out of a matrix suitable for retreading of the tire.

12. Apparatus for measuring the diameter and bead-to-bead dimensions of a tire, the apparatus comprising:
frame means;

a referencing assembly mounted on said frame means and comprising read-out means and indicator means arranged for movement relative to said frame and to one another;

said read-out means carrying designations of selected retreading matrices determined as a function of tire diameter and bead-to-bead dimension; said indicator means positioned to indicate selected designations on said read-out means;

shiftable measuring means mounted on said frame and engageable with the crown of the tire;

said shiftable measuring means being drivingly connected to at least one of said means comprising said assembly means to produce relative displacement between said read-out means and said indicator means in response to shifting of said shiftable measuring means upon engagement thereof with the crown of a tire being measured; and deflectable measuring means mounted on said frame means and including segments that are flexibly engageable with both side walls of the tire;

said segments being connected to the other means comprising said assembly means to produce additional realtive displacement between said read-out means and said indicator means in response to deflection of said segments; and said segments being interconnected to one another so that deflections of said segments in response to engagement with both side walls of the tire are combined to produce said additional relative displacement in accordance with the combined magnitude of such deflections.

* * * * *